United States Patent
Lu et al.

(10) Patent No.: US 11,489,634 B2
(45) Date of Patent: Nov. 1, 2022

(54) HARQ FEEDBACK PROCESSING METHOD, SIGNAL PROCESSING METHOD, COMMUNICATION NODE, AND COMPUTER READABLE STORAGE MEDIUM

(71) Applicant: ZTE Corporation, Shenzhen (CN)

(72) Inventors: Zhaohua Lu, Shenzhen (CN); Yijian Chen, Shenzhen (CN); Chuangxin Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/764,923

(22) PCT Filed: Sep. 4, 2018

(86) PCT No.: PCT/CN2018/104038
§ 371 (c)(1),
(2) Date: May 18, 2020

(87) PCT Pub. No.: WO2019/095797
PCT Pub. Date: May 23, 2019

(65) Prior Publication Data
US 2020/0344011 A1   Oct. 29, 2020

(30) Foreign Application Priority Data
Nov. 17, 2017 (CN) .......................... 201711147334.1

(51) Int. Cl.
*H04L 1/18* (2006.01)
*H04W 28/04* (2009.01)

(52) U.S. Cl.
CPC ........... *H04L 1/1854* (2013.01); *H04W 28/04* (2013.01)

(58) Field of Classification Search
CPC ......... H04W 48/20; H04W 8/22; H04W 8/02; H04W 4/80; H04W 12/08; H04L 12/2812
See application file for complete search history.

(56) References Cited

U.S. PATENT DOCUMENTS

2012/0320857 A1   12/2012   Chun
2016/0135143 A1*   5/2016   Won ..................... H04W 12/08
                                                                    370/312
(Continued)

FOREIGN PATENT DOCUMENTS

CN   101997663 A   3/2011
CN   102088433 A   6/2011
(Continued)

OTHER PUBLICATIONS

International Search Report for corresponding application PCT/CN2018/104038 filed Sep. 4, 2018; dated Nov. 28, 2018.
(Continued)

*Primary Examiner* — Syed Ali
(74) *Attorney, Agent, or Firm* — Cantor Colburn LLP

(57) ABSTRACT

Provided are a hybrid automatic repeat request (HARQ) feedback processing method, a signal processing method, a communication node and a computer-readable storage medium. In the HARQ feedback processing method, flexibility of a system is improved by setting flexible HARQ feedback time, and specifically, a control signal including HARQ feedback time indication information is generated in a certain manner; in the signal processing method, different communication channels are respectively allocated for reference signal activation information and reference signal deactivation information, so that channel environment compatibility is improved, the decoding success rate of a control channel is improved, and the performance of a fifth-generation mobile communication system is improved.

4 Claims, 4 Drawing Sheets

A first communication node generates control information — S101

The first communication node sends the control information to a second communication node — S102

(56) References Cited

U.S. PATENT DOCUMENTS

| | | |
|---|---|---|
| 2016/0226630 A1 | 8/2016 | Zhang |
| 2017/0126379 A1* | 5/2017 | Choi ........................ H04W 4/80 |
| 2018/0049221 A1* | 2/2018 | Park ..................... H04W 48/20 |
| 2018/0176979 A1* | 6/2018 | Ryu ...................... H04W 68/02 |
| 2019/0013903 A1* | 1/2019 | Zhang .................. H04L 5/0082 |
| 2019/0116608 A1* | 4/2019 | Kim ...................... H04W 72/04 |
| 2019/0261140 A1* | 8/2019 | Fujishiro ................. H04W 4/80 |
| 2019/0320306 A1* | 10/2019 | Urabayashi ............. H04L 5/001 |
| 2019/0356460 A1* | 11/2019 | Tsuboi ............... H04W 74/0833 |
| 2019/0363843 A1* | 11/2019 | Gordaychik .......... H04W 52/58 |
| 2020/0028640 A1* | 1/2020 | Yeo ......................... H04L 5/005 |
| 2020/0037385 A1* | 1/2020 | Park ..................... H04W 76/18 |

FOREIGN PATENT DOCUMENTS

| | | |
|---|---|---|
| CN | 102255709 A | 11/2011 |
| CN | 102595600 A | 7/2012 |
| CN | 105991247 A | 10/2016 |
| CN | 1061655330 A | 11/2016 |
| CN | 107294646 A | 10/2017 |

OTHER PUBLICATIONS

Chinese Office Action for corresponding application 201711147334. 1; Report dated Mar. 3, 2021.
Chinese Search Report for corresponding application 201711147334. 1; Report dated Mar. 3, 2021.

* cited by examiner

HARQ FEEDBACK PROCESSING METHOD, SIGNAL PROCESSING METHOD, COMMUNICATION NODE, AND COMPUTER READABLE STORAGE MEDIUM

CROSS-REFERENCES TO RELATED APPLICATIONS

This application is a U.S. National Stage Application, filed under 35 U.S.C. 371, of International Patent Application No. PCT/CN2018/104038, filed on Sep. 4, 2018, which is based on and claims priority to a Chinese patent application No. 201711147334.1 filed on Nov. 17, 2017, disclosure of which are incorporated herein by reference in their entireties.

TECHNICAL FIELD

The present disclosure relates to the field of mobile communications, and in particular relates to a hybrid automatic repeat request (HARQ) feedback processing method, a signal processing method, a communication node and a computer-readable storage medium.

BACKGROUND

The fifth-Generation (5G) technology will meet requirements for diversified services in various areas such as residence, work, recreation and transportation. Even in scenarios such as dense residential areas, offices, stadiums, open-air gatherings, subways, expressways, high-speed rails and wide-area coverage places which are characterized by ultra-high traffic density, ultra-high connection density and ultra-high mobility, the 5G technology may also provide users with excellent service experience such as ultra-high definition videos, virtual reality, augmented reality, cloud desktops and online games. Meanwhile, the 5G technology will permeate into the Internet of Things and various industries and deeply integrate with industrial facilities, medical instruments and vehicles, effectively meeting requirements for diversified services in vertical industries such as industry, medical treatment and transportation and achieving the "Internet of everything".

However, in order to meet this principle, forward compatibility of the original control channel design in LTE is very poor, for example, the format of physical control information is single, the processing is simple, the supported waveform is single, the flexibility of system expansion is poor, and so on. In a 5G system design, forward compatibility is an important design principle. How to reduce the overhead of control information as much as possible while meeting the design criterion is also a key issue to be considered in the 5G system design. At present, no suitable solution has been proposed.

SUMMARY

The embodiments of the present disclosure provide a hybrid automatic repeat request (HARQ) feedback processing method, a signal processing method, a communication node and a computer-readable storage medium, aiming to solve the contradiction and defect between a forward compatibility setting criterion and control overhead with respect to a signal processing mode in the existing art.

To solve the above technical problem, in a first aspect, an embodiment of the present disclosure provides a HARQ feedback processing method. The method includes steps described below: control information is generated; feedback time indication information is sent to a second communication node, where the feedback time indication information is used for determining feedback time and sending the control information to the second communication node, and the control information may include HARQ feedback time indication information used for determining HARQ feedback time by the second communication node. A time length in the HARQ feedback time indication information may include at least one of:

the time length being N times as long as a potential transmission period of the control information;
the time length being N times as long as a basic allocation unit of a potential transmission period of the control information; or
the time length being N times as long as a negotiated allocation unit negotiated with the second communication node; where N is an integer greater than or equal to 1.

In a second aspect, an embodiment of the present disclosure further provides a HARQ feedback processing method. The method includes steps described below: control information sent by a first communication node is received; time for sending the HARQ feedback is determined according to the control information. The control information may include HARQ feedback time indication information. A time length in the HARQ feedback time indication information may include at least one of:

the time length being N times as long as a potential transmission period of the control information;
the time length being N times as long as a basic allocation unit of a potential transmission period of the control information; or
the time length being N times as long as a negotiated allocation unit negotiated with the second communication node; where N is an integer greater than or equal to 1.

In a third aspect, an embodiment of the present disclosure further provides a signal processing method. The method includes steps described below: first control signaling is sent through a first channel; and second control signaling is sent through a second channel. Where the first control signaling may include reference signal activation information, and the second control signaling may include reference signal deactivation information.

In a fourth aspect, an embodiment of the present disclosure further provides a signal processing method. The method includes steps described below: first control signaling is received through a first channel; and second control signaling is received through a second channel. Where the first control signaling includes reference signal activation information, and the second control signaling includes reference signal deactivation information.

In addition, an embodiment of the present disclosure further provides a control information processing method. The method includes steps described below: configuration information of a channel state information reference signal is sent to a second communication node; and the channel state information reference signal is sent according to a preset rule. The preset rule may include at least one of:

a rule of using the overlapped resource when a resource used by the channel state information reference signal overlaps a resource in a control resource set of the second communication node;
a rule of using the resource when a resource used by the channel state information reference signal is located on the same OFDM symbol as a resource in a control resource set of the second communication node;

a rule of using the overlapped resource when a resource used by the channel state information reference signal overlaps a resource used by a downlink demodulation reference signal of the second communication node; or a rule of using the resource when a resource used by the channel state information reference signal is located on the same OFDM symbol as a resource of a downlink demodulation reference signal of the second communication node.

In addition, an embodiment of the present disclosure further provides a control information processing method. The method includes steps described below: configuration information of a channel state information reference signal sent by a first communication node is received; and the channel state information reference signal is received according to a preset rule. The preset rule may include at least one of:

a rule of using the overlapped resource when a resource used by the channel state information reference signal overlaps a resource in a control resource set of a second communication node;

a rule of using the resource when a resource used by the channel state information reference signal is located on the same OFDM symbol as a resource in a control resource set of a second communication node;

a rule of using the overlapped resource when a resource used by the channel state information reference signal overlaps a resource used by a downlink demodulation reference signal of a second communication node; or a rule of using the resource when a resource used by the channel state information reference signal is located on the same OFDM symbol as a resource of a downlink demodulation reference signal of a second communication node.

In addition, an embodiment of the present disclosure further provides a control information processing method. The method includes steps described below: a candidate sending time set of a physical downlink control channel related to a random access process is determined according to first parameter information carried by a physical broadcast channel or second parameter information carried by a physical downlink shared channel; and appropriate sending time is selected from the candidate sending time set for sending the downlink control channel.

In addition, an embodiment of the present disclosure further provides a control information processing method. The method includes steps described below: a candidate sending time set of a physical downlink control channel related to a random access process is determined according to first parameter information carried by a physical broadcast channel or second parameter information carried by a physical downlink shared channel; and the downlink control channel is received according to the candidate sending time set.

In addition, an embodiment of the present disclosure further provides a communication node. The communication node includes a second processor, a second memory and a second communication bus.

The second communication bus is configured to implement connection and communication between the second processor and the second memory.

The second processor is configured to execute a control information processing program stored in the second memory to implement the steps of controlling a HARQ feedback or the steps of the signal processing method or the steps of the control information processing method described above.

In addition, an embodiment of the present disclosure further provides a computer-readable storage medium, which is configured to store one or more computer programs executable by one or more processors to implement the steps of the HARQ feedback processing methods described above or the steps of the signal processing methods or the steps of the control information processing methods described above.

The present disclosure has the beneficial effects described below.

The present disclosure provides a HARQ feedback processing method, a signal processing method, a communication node and a computer-readable storage medium. In the HARQ feedback processing method, flexibility of a system is improved by setting flexible HARQ feedback time, and specifically, the control information is generated in a certain manner, and may include HARQ feedback time indication information determined according to a potential transmission period or basic allocation unit or negotiated allocation unit of the control information, and then the control information is sent to the second communication node. Through implementation of the embodiments of the present disclosure, the flexible setting of the time length of the feedback time of the HARQ is achieved in various ways, so that the channel environment compatibility is improved, the decoding success rate of a control channel is improved, and the performance of a fifth-generation mobile communication system is improved; in the signal processing method, different communication channels are respectively allocated for the reference signal activation information and the reference signal deactivation information, and the method may specifically include sending the reference signal activation information to the second communication node through the first channel, and sending the reference signal deactivation information to the second communication node through the second channel, where the first channel and the second channel are different communication channels, so that the channel environment compatibility is improved, the decoding success rate of the control channel is improved, and the performance of the fifth-generation mobile communication system is improved.

Other features and corresponding beneficial effects of the present disclosure are set forth later in the description, and it should be understood that at least some of the beneficial effects become apparent from the description of the present disclosure.

DETAILED DESCRIPTION

To illustrate the objects, technical solutions and advantages of the present disclosure clearer, the embodiments of the present disclosure will be described below in detail in conjunction with the specific embodiments and drawings. It should be understood that specific embodiments described herein are intended to explain the present disclosure, and not to limit the present disclosure.

First Embodiment

Figure 1:
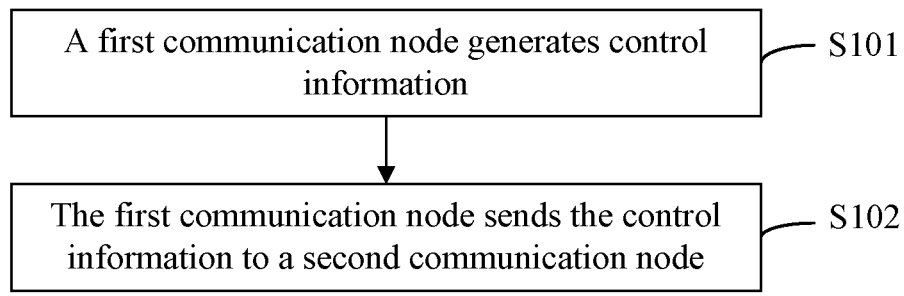
FIG. 1 is a flowchart of an HARQ feedback processing method according to a first embodiment of the present disclosure.

Referring to FIG. 1, FIG. 1 is a flowchart of an HARQ feedback processing method according to a first embodiment of the present disclosure. The method may include S101 and S102.

In S101, a first communication node generates control information.

In S102, the first communication node sends the control information to a second communication node. The control information may include HARQ feedback time indication information used for determining HARQ feedback time by the second communication node. A time length in the HARQ feedback time indication information may include at least one of:

the time length being N times as long as a potential transmission period of the control information;

the time length being N times as long as a basic allocation unit of a potential transmission period of the control information; or the time length being N times as long as a negotiated allocation unit negotiated with the second communication node; where N is an integer greater than or equal to 1.

The HARQ is a technique formed by combining forward error correction coding (FEC) and an automatic repeat request (ARQ). Key words about the HARQ are storage, repeat request, and combination and demodulation. When decoding fails, the receiving party saves the received data and requires the sending party to retransmit the data, and the receiving party combines the retransmitted data and the previously received data and then performs decoding. A certain diversity gain is achieved, the number of retransmissions is reduced, furthermore the time delay is reduced.

In the embodiment, the step of sending the HARQ feedback time indication information to the second communication node may include steps described below.

Control information is generated according to a preset communication protocol, where the control information may include the HARQ feedback time indication information; and the control information is sent to the second communication node. That is, the HARQ feedback time indication information may be encapsulated in the form of control information for transmission, and the encapsulation manner may be arbitrary; if not specified, the HARQ feedback indication information in the embodiments is transmitted by taking control information as a carrier.

Optionally, the step of determining the HARQ feedback time indication information according to the potential transmission period may include: determining the HARQ feedback time according to the potential transmission period of the control information, or determining the HARQ feedback time according to the basic allocation unit of the potential transmission period of the control information; the step of determining the HARQ feedback time indication information according to negotiation with the second communication node may include: determining the HARQ feedback time according to the negotiation with the second communication node. That is, the HARQ feedback time may be determined in at least one of the above-mentioned manners; where N is an integer greater than or equal to 1. The potential transmission period indicates the transmission period of control information to a certain extent, but this transmission period is not a definite transmission period, and the control information may optionally be sent or not sent within the transmission period.

The HARQ feedback time in the embodiment, i.e., the time length indicated in the HARQ feedback time indication information, will be described below in detail.

When the time length indicated by the HARQ feedback time indication information is N times as long as the potential transmission period of the control information, specifically, for example, when the potential transmission period of the control information is one slot (one slot including two orthogonal frequency division multiplexing (OFDM) symbols), the control information may or may not be sent over each slot, and the second communication node attempts to decode the control information in each potential transmission period; the control information allocates a physical downlink shared channel (PDSCH) to the second communication node, and the time length indicated by the HARQ feedback time indication information of the second communication node for the PDSCH is carried by a specific bit sequence in the control information, for example, '00' represents that feedback is required at current slot x where the control information is located, '01' represents that feedback is required at a next slot, slot (x+1), '10' represents that feedback is required at slot (x+2), and '11' represents that feedback is required at slot (x+3). The above example is illustrated by taking the potential transmission period of the control information as one slot as an example, and when the potential transmission period of the control information is of other lengths, the process of determining the time length indicated by the HARQ feedback time indication information is similar.

When the time length corresponding to the HARQ feedback time indication information is N times as long as the basic allocation unit of the potential transmission period of the control information, specifically, for example, when the potential transmission period of the control information is two slots, one slot includes four OFDM symbols, and each slot is equivalent to an OFDM set and includes two OFDM symbols, the control information may or may not be sent over the first slot of every two slots, the second communication node attempts to decode the control information within each potential transmission period, the control information allocates a PDSCH to the second communication node, and the time length indicated by the HARQ feedback time indication information of the second communication node for the PDSCH is carried by a specific bit sequence of the control information, for example, '00' represents that feedback is required at current slot x where the control information is located, '01' represents that feedback is required at a next slot, slot (x+1), which is equivalent to one time as long as the basic allocation unit, '10' represents that feedback is required at slot (x+2), which is equivalent to two times as long as the basic allocation unit, and '11' represents that feedback is required at slot (x+3), which is equivalent to three times as long as the basic allocation unit. The above example is illustrated by taking the basic allocation unit of the potential transmission period of the control information as one slot as an example, and when the basic allocation unit of the potential transmission period of the control information is of other lengths, the process of determining the time length indicated by the HARQ feedback time indication information is similar. It is worth mentioning that the basic allocation unit may be predefined or configured by the first communication node to the second communication node, and is not necessarily equal to the potential transmission period or the potential transmission period is not necessary to be a multiple of the basic allocation unit.

When the time length corresponding to the HARQ feedback time indication information is N times as long as the negotiated allocation unit negotiated by the first communication node and the second communication node, specifically, for example, when the first communication node configures the negotiated allocation unit to be two slots to the second communication node through signaling, and the two slots include four OFDM symbols, the control information sent by the first communication node allocates a PDSCH to the second communication node, and the time length indicated by the HARQ feedback time indication information of the second communication node for the PDSCH is carried by a specific bit sequence of the control information, for example, '00' represents that feedback is required at current slot x where the control information is located, '01' represents that feedback is required at slot (x+2), which is equivalent to one time as long as the negotiated allocation unit, '10' represents that feedback is required at slot (x+4), which is equivalent to two times as long as the negotiated allocation unit, and '11' represents that feedback is required at slot (x+6), which is equivalent to three times as long as the negotiated allocation unit. The above example is illustrated by taking a negotiated allocation unit of two slots as an example, and when the negotiated allocation unit is of other lengths, the process of determining the time length indicated by the HARQ feedback time indication information is similar. It is worth mentioning that the negotiated allocation unit refers to being determined through negotiation by the first communication node and the second communication node, and has no necessary connection with the potential transmission period of the control information or the basic allocation unit of the potential transmission period of the control information.

Optionally, in the embodiment, the potential transmission period of the control information may include M OFDM symbol sets, each OFDM symbol set may include Z OFDM symbols, and a subcarrier spacing corresponding to the OFDM symbol may be an integer multiple of 15 KHz or a power of 2 times of 15 KHz.

In addition, the time length of the OFDM symbol set and the basic allocation unit of the potential transmission period of the control information may be equal.

The time length indicated by the HARQ feedback time indication information may be N times as long as a potential transmission period of the control information, or N times as long as a basic allocation unit of the potential transmission period of the control information, or N times as long as a negotiated allocation unit negotiated by the first communication node and the second communication node; then, the parameters such as the potential transmission period of the control information or the basic allocation unit of the potential transmission period of the control information may be predefined or configured by the first communication node to the second communication node, and the negotiated allocation unit may be obtained from negotiation by the first communication node and the second communication node.

Specifically, in the embodiment, the step of sending the control information to the second communication node may include: sending the control information to the second communication node through a physical control channel or high-layer signaling.

In addition, the first communication node in the embodiment specifically refers to a base station of each large operator, and the second communication node is a terminal having a communication function, such as a mobile phone, a PAD, a smart wearable device and other mobile terminals.

The implementation of the embodiment is described in detail below.

Implementation One

A first communication node generates control information.

The first communication node sends the control information to a second communication node.

Optionally, the control information may include HARQ feedback time indication information indicating a time length N times as long as a potential transmission period of the control information, and N is an integer greater than or equal to 1.

For example, the potential transmission period of the control information is one slot (including two OFDM symbols), and then the control information may or may not be sent over each slot, the second communication node attempts to decode the control information in each potential transmission period, the control information allocates a PDSCH to the second communication node, and the time length indicated by the HARQ feedback time indication information of the second communication node for the PDSCH is carried by a specific bit sequence of the control information, for example, '00' represents that feedback is required at current slot x where the control information is located, '01' represents that feedback is required at a next slot, slot (x+1), '10' represents that feedback is required at slot (x+2), and '11' represents that feedback is required at slot (x+3).

Optionally, the subcarrier spacing corresponding to the OFDM symbol may be an integer multiple of 15 KHz or a power of 2 times of 15 KHz.

Implementation Two

A first communication node generates control information.

The first communication node sends the control information to a second communication node.

Optionally, the control information may include HARQ feedback time indication information indicating a time length N times as long as a basic allocation unit of the potential transmission period of the control information, and N is an integer greater than or equal to 1.

For example, the potential transmission period of the control information is two slots, and then the control information may or may not be sent over the first slot of every two slots, the second communication node attempts to decode the control information in each potential transmission period, the control information allocates a PDSCH to the second communication node, and the time length indicated by the HARQ feedback time indication information of the second communication node for the PDSCH is carried by a specific bit sequence of the control information, for example, '00' represents that feedback is required at current slot x where the control information is located, '01' represents that feedback is required at a next slot, slot (x+1) (which is equivalent to one time as long as the basic allocation unit), '10' represents that feedback is required at slot (x+2) (which is equivalent to two times as long as the basic allocation unit), and '11' represents that feedback is required at slot (x+3) (which is equivalent to three times as long as the basic allocation unit).

Optionally, the subcarrier spacing corresponding to the OFDM symbol may be an integer multiple of 15 KHz or a power of 2 times of 15 KHz.

Implementation Three

A first communication node generates control information.

The first communication node sends the control information to a second communication node.

Optionally, the control information may include HARQ feedback time indication information indicating a time length N times as long as a negotiated allocation unit negotiated by the first communication node and the second negotiation node, and N is an integer greater than or equal to 1.

For example, the first communication node configures a negotiated allocation unit of two slots (including four OFDM symbols) to the second communication node through signaling, control information sent by the first communication node allocates a PDSCH to the second communication node, and a time length indicated by HARQ feedback time indication information of the second communication node for the PDSCH is carried by a specific bit sequence of the control information, for example, '00' represents that feedback is required at current slot x where the control information is located, '01' represents that feedback is required at slot (x+2) (which is equivalent to one time as long as the negotiated allocation unit), '10' represents that feedback is required at slot (x+4) (which is equivalent to two times as long as the negotiated allocation unit), and '11' represents that feedback is required at slot (x+6) (which is equivalent to three times as long as the negotiated allocation unit).

Optionally, the subcarrier spacing corresponding to the OFDM symbol may be an integer multiple of 15 KHz or a power of 2 times of 15 KHz.

Implementation Four

A first communication node generates control information.

The first communication node sends the control information to a second communication node.

Optionally, the control information may include HARQ feedback time indication information, and the time length indicated by the HARQ feedback time indication information is a potential transmission period of the control information, or N times as long as a basic allocation unit of a potential transmission period of the control information, or N times as long as a negotiated allocation unit negotiated by the first communication node and the second communication node; where N is an integer greater than or equal to 1.

Optionally, the potential transmission period of the control information or the basic allocation unit of the potential transmission period of the control information is predefined or configured by the first communication node to the second communication node.

Implementation Five

A first communication node generates control information.

The first communication node sends the control information to a second communication node.

Optionally, the control information may include HARQ feedback time indication information, and the time length indicated by the HARQ feedback time indication information is a potential transmission period of the control information, or N times as long as a basic allocation unit of a potential transmission period of the control information, or N times as long as a negotiated allocation unit negotiated by the first communication node and the second communication node; where N is an integer greater than or equal to 1.

Optionally, the step of sending the control information to the second communication node may include: the first communication node sending the control information through a physical control channel or high-layer signaling.

Second Embodiment

Figure 2:
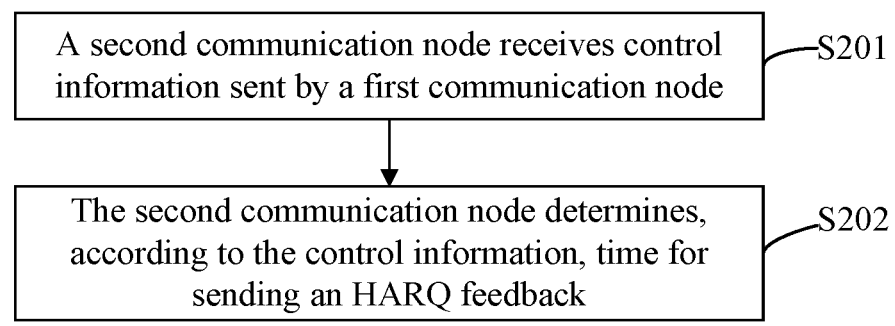
FIG. 2 is a flowchart of an HARQ feedback processing method according to a second embodiment of the present disclosure.

Referring to FIG. 2, FIG. 2 is a flowchart of an HARQ feedback processing method according to a second embodiment of the present disclosure. The method may include S201 and S202.

In S201, a second communication node receives control information sent by a first communication node.

In S202, the second communication node determines, according to the control information, time for sending an HARQ feedback. The control information may include HARQ feedback time indication information. A time length in the HARQ feedback time indication information may include at least one of:

the time length being N times as long as a potential transmission period of the control information;

the time length being N times as long as a basic allocation unit of a potential transmission period of the control information; or the time length being N times as long as a negotiated allocation unit negotiated with the second communication node; where N is an integer greater than or equal to 1.

In the embodiment, the step of receiving HARQ feedback time indication information sent by the first communication node may include: receiving control information sent by the first communication node, where the control information may include HARQ feedback time indication information. That is, the HARQ feedback time indication information may be encapsulated in the form of control information for transmission, and the encapsulation manner may be arbitrary; if not specified, the HARQ feedback indication information in the embodiment is transmitted by taking control information as a carrier.

Optionally, the step of determining the HARQ feedback time indication information according to the potential transmission period may include: determining the HARQ feedback time according to the potential transmission period of the HARQ control information, or determining the HARQ feedback time according to the basic allocation unit of the potential transmission period of the HARQ control information; the step of determining the HARQ feedback time indication information according to negotiation with the second communication node may include: determining the HARQ feedback time according to the negotiation with the second communication node. That is, the HARQ feedback time may be determined in at least one of the above-mentioned manners; where N is an integer greater than or equal to 1.

The HARQ feedback time in the embodiment, i.e., the time length indicated in the HARQ feedback time indication information, will be described below in detail.

When the time length corresponding to the HARQ feedback time indication information is N times as long as the potential transmission period of the control information, specifically, for example, when the potential transmission period of the control information is one slot (one slot including two OFDM symbols), the control information may or may not be sent over each slot, and the second communication node attempts to decode the control information in each potential transmission period; the control information allocates a PDSCH to the second communication node, and the time length indicated by the HARQ feedback time indication information of the second communication node for the PDSCH is carried by a specific bit sequence in the control information, for example, '00' represents that feedback is required at current slot x where the control information is located, '01' represents that feedback is required at a next slot, slot (x+1), '10' represents that feedback is required at slot (x+3), and '11' represents that feedback is required at slot (x+3). The above example is illustrated by taking the potential transmission period of the control information as one slot as an example, and when the potential transmission period of the control information is of other lengths, the process of determining the time length indicated by the HARQ feedback time indication information is similar.

When the time length corresponding to the HARQ feedback time indication information is N times as long as the basic allocation unit of the potential transmission period of the control information, specifically, for example, when the potential transmission period of the control information is two slots, one slot includes four OFDM symbols, and each slot is equivalent to an OFDM set and includes two OFDM symbols, the control information may or may not be sent over the first slot of every two slots, the second communication node attempts to decode the control information within each potential transmission period, the control information allocates a PDSCH to the second communication node, and the time length indicated by the HARQ feedback time indication information of the second communication node for the PDSCH is carried by a specific bit sequence of the control information, for example, '00' represents that feedback is required at current slot x where the control information is located, '01' represents that feedback is required at a next slot, slot (x+1), which is equivalent to one time as long as the basic allocation unit, '10' represents that feedback is required at slot (x+2), which is equivalent to two times as long as the basic allocation unit, and '11' represents that feedback is required at slot (x+3), which is equivalent to three times as long as the basic allocation unit. The above example is illustrated by taking the basic allocation unit of the potential transmission period of the control information as one slot as an example, and when the basic allocation unit of the potential transmission period of the control information is of other lengths, the process of determining the time length indicated by the HARQ feedback time indication information is similar. It is worth mentioning that the basic allocation unit may be predefined or configured by the first communication node to the second communication node, and is not necessarily equal to the potential transmission period or the potential transmission period is not necessary to be a multiple of the basic allocation unit.

When the time length corresponding to the HARQ feedback time indication information is N times as long as the negotiated allocation unit negotiated by the first communication node and the second communication node, specifically, for example, when the first communication node configures the negotiated allocation unit to be two slots to the second communication node through signaling, and the two slots include four OFDM symbols, the control information sent by the first communication node allocates a PDSCH to the second communication node, and the time length indicated by the HARQ feedback time indication information of the second communication node for the PDSCH is carried by a specific bit sequence of the control information, for example, '00' represents that feedback is required at current slot x where the control information is located, '01' represents that feedback is required at slot (x+2), which is equivalent to one time as long as the negotiated allocation unit, '10' represents that feedback is required at slot (x+4), which is equivalent to two times as long as the negotiated allocation unit, and '11' represents that feedback is required at slot (x+6), which is equivalent to three times as long as the negotiated allocation unit. The above example is illustrated by taking a negotiated allocation unit of two slots as an example, and when the negotiated allocation unit is of other lengths, the process of determining the time length indicated by the HARQ feedback time indication information is similar. It is worth mentioning that the negotiated allocation unit refers to being determined through negotiation by the first communication node and the second communication node, and has no necessary connection with the potential transmission period of the control information or the basic allocation unit of the potential transmission period of the control information.

Optionally, in the embodiment, the potential transmission period of the control information may include M OFDM symbol sets, each OFDM symbol set may include Z OFDM symbols, and a subcarrier spacing corresponding to the OFDM symbol may be an integer multiple of 15 KHz or a power of 2 times of 15 KHz. In addition, the time length of the OFDM symbol set and the basic allocation unit of the potential transmission period of the HARQ control information may be equal.

The time length indicated by the HARQ feedback time indication information may be N times as long as a potential transmission period of the control information, or N times as long as a basic allocation unit of the potential transmission period of the control information, or N times as long as a negotiated allocation unit negotiated by the first communication node and the second communication node; then, the parameters such as the potential transmission period of the control information or the basic allocation unit of the potential transmission period of the control information may be predefined or configured by the first communication node to the second communication node, and the negotiated allocation unit may be obtained from negotiation by the first communication node and the second communication node.

Specifically, in the embodiment, the step of receiving the control information sent by the first communication node may include: receiving the control information through a physical control channel or high-layer signaling.

In addition, the first communication node in the embodiment specifically refers to a base station of each large operator, and the second communication node is a terminal having a communication function, such as a mobile phone, a PAD, a smart wearable device and other mobile terminals.

The implementation of the embodiment is described in detail below.

Implementation One

A second communication node receives control information sent by a first communication node.

The second communication node determines, according to the control information, time for sending an HARQ feedback.

Optionally, the control information may include HARQ feedback time indication information indicating a time length N times as long as a potential transmission period of the control information, and N is an integer greater than or equal to 1.

For example, the potential transmission period of the control information is one slot (including two OFDM symbols), and then the control information may or may not be sent over each slot, the second communication node attempts to decode the control information in each potential transmission period, the control information allocates a PDSCH to the second communication node, and the time length indicated by the HARQ feedback time indication information of the second communication node for the PDSCH is carried by a specific bit sequence of the control information, for example, '00' represents that feedback is required at current slot x where the control information is located, '01' represents that feedback is required at a next slot, slot (x+1), '10' represents that feedback is required at slot (x+2), and '11' represents that feedback is required at slot (x+3).

Optionally, the subcarrier spacing corresponding to the OFDM symbol may be an integer multiple of 15 KHz or a power of 2 times of 15 KHz.

Implementation Two

A second communication node receives control information sent by a first communication node.

The second communication node determines, according to the control information, time for sending an HARQ feedback.

Optionally, the control information may include HARQ feedback time indication information indicating a time length N times as long as a basic allocation unit of the potential transmission period of the control information, and N is an integer greater than or equal to 1.

For example, the potential transmission period of the control information is two slots (including four OFDM symbols, each slot (equivalent to an OFDM set) including two OFDM symbols), and then the control information may or may not be sent over the first slot of every two slots, the second communication node attempts to decode the control information in each potential transmission period, the control information allocates a PDSCH to the second communication node, and the time length indicated by the HARQ feedback time indication information of the second communication node for the PDSCH is carried by a specific bit sequence of the control information, for example, '00' represents that feedback is required at current slot x where the control information is located, '01' represents that feedback is required at a next slot, slot (x+1) (which is equivalent to one time as long as the basic allocation unit), '10' represents that feedback is required at slot (x+2) (which is equivalent to two times as long as the basic allocation unit), and '11' represents that feedback is required at slot (x+3) (which is equivalent to three times as long as the basic allocation unit).

Optionally, the subcarrier spacing corresponding to the OFDM symbol may be an integer multiple of 15 KHz or a power of 2 times of 15 KHz.

Implementation Three

A second communication node receives control information sent by a first communication node.

The second communication node determines, according to the control information, time for sending an HARQ feedback.

Optionally, the control information may include HARQ feedback time indication information indicating a time length N times as long as a negotiated allocation unit negotiated by the first communication node and the second negotiation node, and N is an integer greater than or equal to 1.

For example, the first communication node configures a negotiated allocation unit of two slots (including four OFDM symbols) to the second communication node through signaling, control information sent by the first communication node allocates a PDSCH to the second communication node, and a time length indicated by HARQ feedback time indication information of the second communication node for the PDSCH is carried by a specific bit sequence of the control information, for example, '00' represents that feedback is required at current slot x where the control information is located, '01' represents that feedback is required at slot (x+2) (which is equivalent to one time as long as the negotiated allocation unit), '10' represents that feedback is required at slot (x+4) (which is equivalent to two times as long as the negotiated allocation unit), and '11' represents that feedback is required at slot (x+6) (which is equivalent to three times as long as the negotiated allocation unit).

Optionally, the subcarrier spacing corresponding to the OFDM symbol may be an integer multiple of 15 KHz or a power of 2 times of 15 KHz.

Implementation Four

A second communication node receives control information sent by a first communication node.

The second communication node determines, according to the control information, time for sending an HARQ feedback.

Optionally, the control information may include HARQ feedback time indication information, and the time length indicated by the HARQ feedback time indication information is a potential transmission period of the control information, or N times as long as a basic allocation unit of a potential transmission period of the control information, or N times as long as a negotiated allocation unit negotiated by the first communication node and the second communication node; where N is an integer greater than or equal to 1.

Optionally, the potential transmission period of the control information or the basic allocation unit of the potential transmission period of the control information is predefined or configured by the first communication node to the second communication node.

Implementation Five

A second communication node receives control information sent by a first communication node.

The second communication node determines, according to the control information, time for sending an HARQ feedback.

Optionally, the control information may include HARQ feedback time indication information, and the time length indicated by the HARQ feedback time indication information is a potential transmission period of the control information, or N times as long as a basic allocation unit of a potential transmission period of the control information, or N times as long as a negotiated allocation unit negotiated by the first communication node and the second communication node; where N is an integer greater than or equal to 1.

Optionally, the step of receiving the control information sent by the first communication node may include: receiving the control information through a physical control channel or high-layer signaling.

Third Embodiment

Figure 3:
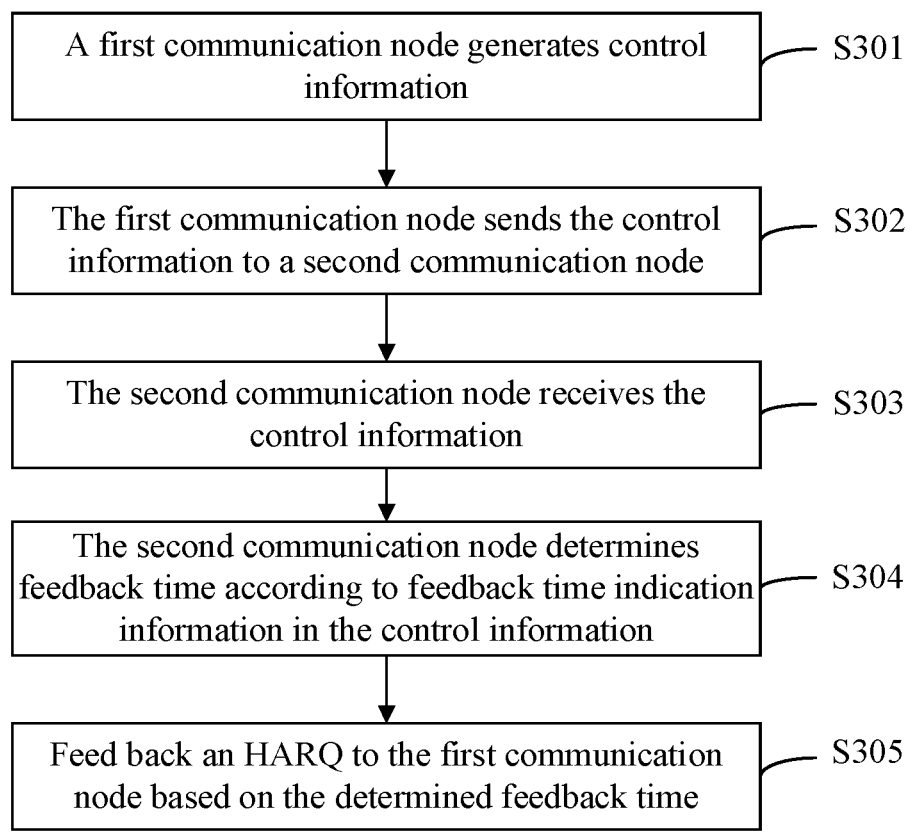
FIG. 3 is a flowchart of an HARQ feedback processing method according to a third embodiment of the present disclosure.

Referring to FIG. 3, FIG. 3 is a flowchart of an HARQ feedback processing method according to a third embodiment of the present disclosure. Firstly, it is determined whether to execute the HARQ feedback flow in the embodiment, where the execution timing of the HARQ feedback flow may be arbitrary; when the HARQ feedback flow needs to be executed, steps described below are performed.

In S301, a first communication node generates control information carrying HARQ feedback time indication information.

Specifically, the time length indicated in the HARQ feedback time indication information, that is, the time length for a second communication node to feed back an HARQ, may be as follows: the time length indicated in the feedback time indication information is determined according to N times as long as the potential transmission period of the control information. For example, when the transmission period of the control information is 2, if the current position for sending the control information is X and the value of bits carried in the control information is 01, the time length indicated in the feedback time indication information is 4, and the time for feeding back the HARQ is (X+2).

In S302, the first communication node sends the control information to a second communication node.

The control information may be sent to the second communication node through a physical control channel.

In S303, the second communication node receives the control information.

Correspondingly, the second communication node also receives, through the physical control channel, the control information sent by the first communication node.

In S304, the second communication node determines the HARQ feedback time according to the feedback time indication information in the control information.

The second communication node analyzes the value of bits in the control information and determines the HARQ feedback time, for example, when the transmission period of the control information is 2, if the current position for sending the control information is X and the value of bits carried in the control information is 01, the time length indicated in the feedback time indication information is 4, and the time for feeding back the HARQ is (X+2).

In S305, the HARQ is fed back to the first communication node based on the determined feedback time.

Fourth Embodiment

Figure 4:
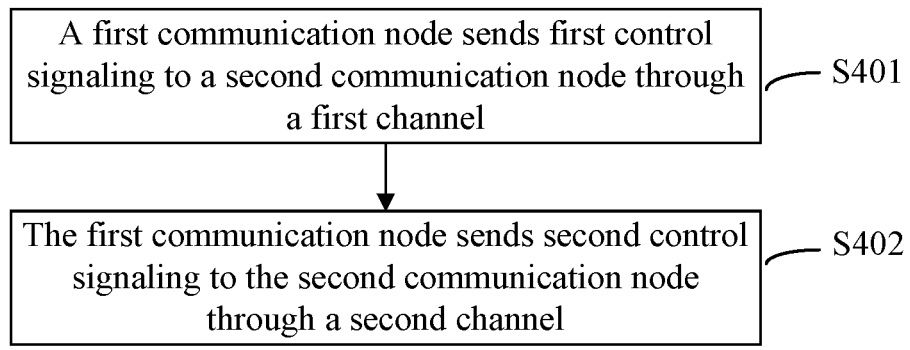
FIG. 4 is a flowchart of a signal processing method according to a fourth embodiment of the present disclosure.

Referring to FIG. 4, FIG. 4 is a flowchart of a control information processing method according to a fourth embodiment of the present disclosure. The method may include S401 and S402.

In S401, a first communication node sends first control signaling to a second communication node through a first channel.

In S402, the first communication node sends second control signaling to the second communication node through a second channel.

The first control signaling may include reference signal activation information, and the second control signaling may include reference signal deactivation information. Furthermore, the first channel and the second channel in the embodiment are specifically different communication channels; optionally, the first channel may be a physical downlink control channel and the second channel may be a physical downlink data channel.

A reference signal (RS) is a "pilot" signal and is a known signal provided by a transmitting end to a receiving end for channel estimation or channel sounding. In the embodiment, a reference signal may include at least one of: a reference signal for acquiring channel state information, a reference signal for beam management, a sounding signal, or a tracking reference signal for transceiving synchronization.

Optionally, in the embodiment, the step of sending the first control signaling to the second communication node through the first channel may include: generating the first control signaling according to a preset communication protocol, where the first control signaling may include reference signal activation information; and sending the first control signaling to the second communication node. Correspondingly, the step of sending the second control signaling to the second communication node through the second channel may include: generating the second control signaling according to a preset communication protocol, where the second control signaling may include reference signal deactivation information; and sending the second control signaling to the second communication node. The first control signaling and the second control signaling are respectively encapsulations of reference signal activation information and reference signal deactivation information, and if not specified, the reference signal activation information in the embodiments is transmitted by taking the first control signaling as a carrier, and the reference signal deactivation information is transmitted by taking the second control signaling as a carrier.

Optionally, the first control signaling, or reference signal activation information, may be used for triggering the second communication node to send feedback content, and the feedback content may include at least one of: ACK feedback information about successfully receiving the first control signaling or channel information obtained by the second communication node from measurement on the reference signal.

Optionally, the second communication node determines, according to a type of the channel information and/or feedback time, whether to send the ACK feedback information about successfully receiving the first control signaling or reference signal activation information carried in the first control signaling. For example, two types of channel information are included, i.e., the first-type channel information and the second-type channel information. When the channel information is the second-type channel information, the second communication node needs to send the ACK feedback information about successfully receiving the first control signaling; when the channel information is the first-type channel information, the second communication node does not need to send the ACK feedback information about successfully receiving the first control signaling, and at this time, the first communication node may implicitly consider the first-type channel information fed back by the second communication node as successful reception of the first control signaling by the second communication node. For example, when the feedback time of the channel information is greater than a specific threshold, the second communication node needs to send the ACK feedback information about successfully receiving the first control signaling; when the feedback time of the channel information is less than or equal to the specific threshold, the second communication node does not need to send the ACK feedback information about successfully receiving the first control signaling, and at this time, the first communication node may implicitly consider the first-type channel information fed back by the second communication node as successful reception of the first control signaling by the second communication node.

Optionally, a resource used by the reference signal is located outside a bandwidth part (BWP) where the first control signaling is located, and the frequency domain resources of respective bandwidth parts may partially overlap or be completely different.

Optionally, the first control signaling and the second control signaling are located in different bandwidth parts, and the frequency domain resources of respective bandwidth parts may partially overlap or be completely different.

In addition, the first communication node in the embodiment specifically refers to a base station of each large operator, and the second communication node is a terminal having a communication function, such as a mobile phone, a PAD, a smart wearable device and other mobile terminals.

The implementation of the embodiment is described in detail below.

Implementation One

A first communication node sends first control signaling to a second communication node through a first channel.

The first communication node sends second control signaling to the second communication node through a second channel.

Optionally, the first control signaling carries information for activating sending of a reference signal, the second control signaling carries information for deactivating sending of a reference signal, the first channel is a physical downlink control channel, and the second channel is a physical downlink data channel.

Implementation Two

A first communication node sends first control signaling to a second communication node through a first channel.

The first communication node sends second control signaling to the second communication node through a second channel.

Optionally, the first control signaling carries information for activating sending of a reference signal, the second control signaling carries information for deactivating sending of a reference signal, the first channel is a physical downlink control channel, and the second channel is a physical downlink data channel.

Optionally, a reference signal may include at least one of: a reference signal for acquiring channel state information, a reference signal for beam management, a reference signal for acquiring channel-related information, a sounding signal, or a tracking reference signal for transceiving synchronization.

Implementation Three

A first communication node sends first control signaling to a second communication node through a first channel.

The first communication node sends second control signaling to the second communication node through a second channel.

Optionally, the first control signaling carries information for activating sending of a reference signal, the second control signaling carries information for deactivating sending of a reference signal, the first channel is a physical downlink control channel, and the second channel is a physical downlink data channel.

Optionally, the first control signaling triggers the second communication node to send feedback content, and the feedback content may include at least one of: ACK feedback information about successfully receiving the first control signaling or channel information obtained by the second communication node from measurement on the reference signal.

Implementation Four

A first communication node sends first control signaling to a second communication node through a first channel.

The first communication node sends second control signaling to the second communication node through a second channel.

Optionally, the first control signaling carries information for activating sending of a reference signal, the second control signaling carries information for deactivating sending of a reference signal, the first channel is a physical downlink control channel, and the second channel is a physical downlink data channel.

Optionally, the first control signaling triggers the second communication node to send feedback content, and the feedback content may include at least one of: ACK feedback information about successfully receiving the first control signaling or channel information obtained by the second communication node from measurement on the reference signal.

Optionally, the second communication node determines, according to a type of the channel information and/or feedback time, whether to send the ACK feedback information about successfully receiving the first control signaling. For example, two types of channel information are included, i.e., the first-type channel information and the second-type channel information. When the channel information is the second-type channel information, the second communication node needs to send the ACK feedback information about successfully receiving the first control signaling; when the channel information is the first-type channel information, the second communication node does not need to send the ACK feedback information about successfully receiving the first control signaling, and at this time, the first communication node may implicitly consider the first-type channel information fed back by the second communication node as successful reception of the first control signaling by the second communication node. For example, when the feedback time of the channel information is greater than a specific threshold, the second communication node needs to send the ACK feedback information about successfully receiving the first control signaling; when the feedback time of the channel information is less than or equal to the specific threshold, the second communication node does not need to send the ACK feedback information about successfully receiving the first control signaling, and at this time, the first communication node may implicitly consider the first-type channel information fed back by the second communication node as successful reception of the first control signaling by the second communication node.

Implementation Five

A first communication node sends first control signaling to a second communication node through a first channel.

The first communication node sends second control signaling to the second communication node through a second channel.

Optionally, the first control signaling carries information for activating sending of a reference signal, the second control signaling carries information for deactivating sending of a reference signal, the first channel is a physical downlink control channel, and the second channel is a physical downlink data channel.

Optionally, a resource used by the reference signal is located outside a bandwidth part (BWP) where the first control signaling is located, and the frequency domain resources of respective bandwidth parts may partially overlap or be completely different.

Implementation Six

A first communication node sends first control signaling to a second communication node through a first channel.

The first communication node sends second control signaling to the second communication node through a second channel.

Optionally, the first control signaling carries information for activating sending of a reference signal, the second control signaling carries information for deactivating sending of a reference signal, the first channel is a physical downlink control channel, and the second channel is a physical downlink data channel.

Optionally, the first control signaling and the second control signaling are located in different bandwidth parts, and the frequency domain resources of respective bandwidth parts may partially overlap or be completely different.

Fifth Embodiment

Figure 5:
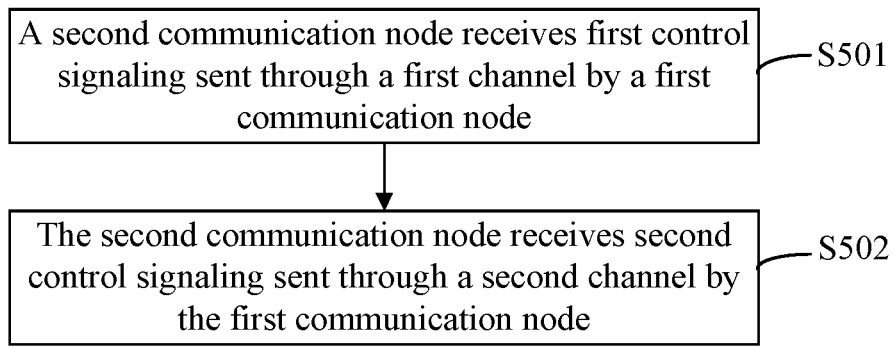
FIG. 5 is a flowchart of a signal processing method according to a fifth embodiment of the present disclosure.

Referring to FIG. 5, FIG. 5 is a flowchart of a signal processing method according to a fifth embodiment of the present disclosure. The method may include S501 and S502.

In S501, a second communication node receives first control signaling sent through a first channel by a first communication node.

In S502, the second communication node receives second control signaling sent through a second channel by the first communication node.

In the embodiment, the first control signaling may include reference signal activation information, and the second control signaling may include reference signal deactivation information, and furthermore, the first channel and the second channel may be different communication channels; specifically, the first channel may be a physical downlink control channel and the second channel may be a physical downlink data channel.

Optionally, a reference signal may include at least one of: a reference signal for acquiring channel state information, a reference signal for beam management, a reference signal for acquiring channel-related information, a sounding signal, or a tracking reference signal for transceiving synchronization.

Optionally, in the embodiment, the step of the second communication node receiving the first control signaling sent by the first communication node through the first channel may specifically include: receiving first control signaling, where the first control signaling may include reference signal activation information. Correspondingly, the second communication node receiving the second control signaling sent by the first communication node through the second channel may specifically include: receiving second control signaling, where the second control signaling may include reference signal deactivation information. The first control signaling and the second control signaling are respectively encapsulations of reference signal activation information and reference signal deactivation information, and if not specified, the reference signal activation information in the embodiments is transmitted by taking the first control signaling as a carrier, and the reference signal deactivation information is transmitted by taking the second control signaling as a carrier.

Optionally, the first control signaling, or reference signal activation information, may be used for triggering the second communication node to send feedback content, and the feedback content may include at least one of: acknowledgement (ACK) feedback information about successfully receiving the first control signaling or channel information obtained by the second communication node from measurement on the reference signal.

Optionally, the second communication node determines, according to a type of the channel information and/or feedback time, whether to send the ACK feedback information about successfully receiving the first control signaling. For example, two types of channel information are included, i.e., the first-type channel information and the second-type channel information. When the channel information is the second-type channel information, the second communication node needs to send the ACK feedback information about successfully receiving the first control signaling or reference signal activation information carried in the first signaling; when the channel information is the first-type channel information, the second communication node does not need to send the ACK feedback information about successfully receiving the first control signaling, and at this time, the first communication node may implicitly consider the first-type channel information fed back by the second communication node as successful reception of the first control signaling by the second communication node. For example, when the feedback time of the channel information is greater than a specific threshold, the second communication node needs to send the ACK feedback information about successfully receiving the first control signaling; when the feedback time of the channel information is less than or equal to the specific threshold, the second communication node does not need to send the ACK feedback information about successfully receiving the first control signaling, and at this time, the first communication node may implicitly consider the first-type channel information fed back by the second communication node as successful reception of the first control signaling by the second communication node.

Optionally, a resource used by the reference signal is located outside a bandwidth part (BWP) where the first control signaling is located, and the frequency domain resources of respective bandwidth parts may partially overlap or be completely different.

Optionally, the first control signaling and the second control signaling are located in different bandwidth parts, and the frequency domain resources of respective bandwidth parts may partially overlap or be completely different.

In addition, the first communication node in the embodiment specifically refers to a base station of each large operator, and the second communication node is a terminal having a communication function, such as a mobile phone, a PAD, a smart wearable device and other mobile terminals.

The implementation of the embodiment is described in detail below.

Implementation One

A second communication node receives first control signaling sent through a first channel by a first communication node.

The second communication node receives second control signaling sent through a second channel by the first communication node.

Optionally, the first control signaling carries information for activating sending of a reference signal, the second control signaling carries information for deactivating sending of a reference signal, the first channel is a physical downlink control channel, and the second channel is a physical downlink data channel.

Implementation Two

A second communication node receives first control signaling sent through a first channel by a first communication node.

The second communication node receives second control signaling sent through a second channel by the first communication node.

Optionally, the first control signaling carries information for activating sending of a reference signal, the second control signaling carries information for deactivating sending of a reference signal, the first channel is a physical downlink control channel, and the second channel is a physical downlink data channel.

Optionally, a reference signal may include at least one of: a reference signal for acquiring channel state information, a reference signal for beam management, a reference signal for acquiring channel-related information, a sounding signal, or a tracking reference signal for transceiving synchronization.

Implementation Three

A second communication node receives first control signaling sent through a first channel by a first communication node.

The second communication node sends feedback content.

The second communication node receives second control signaling sent through a second channel by the first communication node.

Optionally, the first control signaling carries information for activating sending of a reference signal, the second control signaling carries information for deactivating sending of a reference signal, the first channel is a physical downlink control channel, and the second channel is a physical downlink data channel.

Optionally, the first control signaling triggers the second communication node to send feedback content, and the feedback content may include at least one of: ACK feedback information about successfully receiving the first control signaling or channel information obtained by the second communication node from measurement on the reference signal.

Implementation Four

A second communication node receives first control signaling sent through a first channel by a first communication node.

The second communication node sends feedback content.

The second communication node receives second control signaling sent through a second channel by the first communication node.

Optionally, the first control signaling carries information for activating sending of a reference signal, the second control signaling carries information for deactivating sending of a reference signal, the first channel is a physical downlink control channel, and the second channel is a physical downlink data channel.

Optionally, the first control signaling triggers the second communication node to send feedback content, and the feedback content may include at least one of: ACK feedback information about successfully receiving the first control signaling or channel information obtained by the second communication node from measurement on the reference signal.

Optionally, the second communication node determines, according to a type of the channel information and/or feedback time, whether to send the ACK feedback information about successfully receiving the first control signaling. For example, two types of channel information are included, i.e., the first-type channel information and the second-type channel information. When the channel information is the second-type channel information, the second communication node needs to send the ACK feedback information about successfully receiving the first control signaling; when the channel information is the first-type channel information, the second communication node does not need to send the ACK feedback information about successfully receiving the first control signaling, and at this time, the first communication node may implicitly consider the first-type channel information fed back by the second communication node as successful reception of the first control signaling by the second communication node. For example, when the feedback time of the channel information is greater than a specific threshold, the second communication node needs to send the ACK feedback information about successfully receiving the first control signaling; when the feedback time of the channel information is less than or equal to the specific threshold, the second communication node does not need to send the ACK feedback information about successfully receiving the first control signaling, and at this time, the first communication node may implicitly consider the first-type channel information fed back by the second communication node as successful reception of the first control signaling by the second communication node.

Implementation Five

A second communication node receives first control signaling sent through a first channel by a first communication node.

The second communication node receives second control signaling sent through a second channel by the first communication node.

Optionally, the first control signaling carries information for activating sending of a reference signal, the second control signaling carries information for deactivating sending of a reference signal, the first channel is a physical downlink control channel, and the second channel is a physical downlink data channel.

Optionally, a resource used by the reference signal is located outside a bandwidth part where the first control signaling is located, and the frequency domain resources of respective bandwidth parts may partially overlap or be completely different.

Implementation Six

A second communication node receives first control signaling sent through a first channel by a first communication node.

The second communication node receives second control signaling sent through a second channel by the first communication node.

Optionally, the first control signaling carries information for activating sending of a reference signal, the second control signaling carries information for deactivating sending of a reference signal, the first channel is a physical downlink control channel, and the second channel is a physical downlink data channel.

Optionally, the first control signaling and the second control signaling are located in different bandwidth parts, and the frequency domain resources of respective bandwidth parts may partially overlap or be completely different.

Sixth Embodiment

Figure 6:
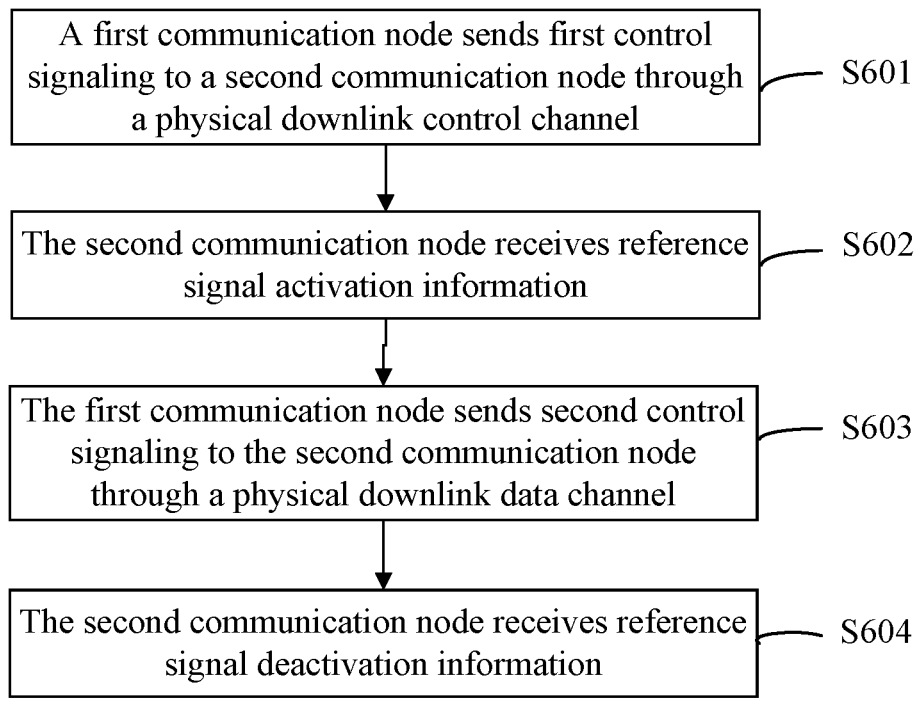
FIG. 6 is a flowchart of a signal processing method according to a sixth embodiment of the present disclosure.

Referring to FIG. 6, FIG. 6 is a flowchart of a signal processing method according to a sixth embodiment of the present disclosure. Firstly, it is determined whether to execute an activation operation on a reference signal, where the required timing of the activation of reference information may be arbitrary; when the activation operation on a reference signal needs to be executed, steps described below are performed:

In S601, a first communication node sends first control signaling to a second communication node through a physical downlink control channel, where the first control signaling carries reference signal activation information.

The first control signaling is further used for triggering the second communication node to send feedback content, and the feedback content may include at least one of: ACK feedback information about successfully receiving the first control signaling or channel information obtained by the second communication node from measurement on the reference signal.

In S602, the second communication node receives the reference signal activation information, and then executes an activation operation on a reference signal.

In S603, when the reference signal needs to be deactivated, the first communication node sends second control signaling to the second communication node through a physical downlink data channel, where the second control signaling carries reference signal deactivation information.

In S604, the second communication node receives the reference signal deactivation information, and then executes a deactivation operation on the reference signal.

The second communication node may further determine, according to a type of the channel information and/or feedback time, whether to send ACK feedback information about successfully receiving the first control signaling. For example, two types of channel information are included, i.e., the first-type channel information and the second-type channel information. When the channel information is the second-type channel information, the second communication node needs to send the ACK feedback information about successfully receiving the first control signaling; when the channel information is the first-type channel information, the second communication node does not need to send the ACK feedback information about successfully receiving the first control signaling, and at this time, the first communication node may implicitly consider the first-type channel information fed back by the second communication node as successful reception of the first control signaling by the second communication node. For example, when the feedback time of the channel information is greater than a specific threshold, the second communication node needs to send the ACK feedback information about successfully receiving the first control signaling; when the feedback time of the channel information is less than or equal to the specific threshold, the second communication node does not need to send the ACK feedback information about successfully receiving the first control signaling, and at this time, the first communication node may implicitly consider the first-type channel information fed back by the second communication node as successful reception of the first control signaling by the second communication node.

Seventh Embodiment

Figure 7:
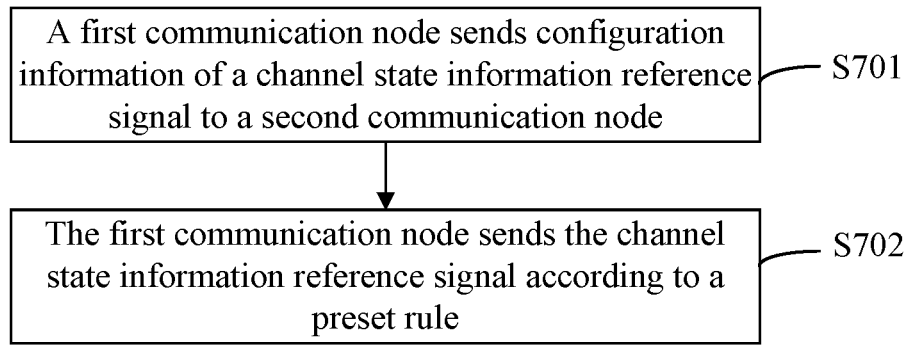
FIG. 7 is a flowchart of a control information processing method according to a seventh embodiment of the present disclosure.

Referring to FIG. 7, FIG. 7 is a flowchart of a control information processing method according to a seventh embodiment of the present disclosure. The method may include S701 and S702.

In S701, a first communication node sends configuration information of a channel state information reference signal to a second communication node.

In S702, the first communication node sends the channel state information reference signal according to a preset rule.

Optionally, the preset rule in the embodiment may include at least one of:

a rule of using the overlapped resource when a resource used by the channel state information reference signal overlaps a resource in a control resource set of the second communication node;

a rule of using the resource when a resource used by the channel state information reference signal is located on the same OFDM symbol as a resource in a control resource set of the second communication node;

a rule of using the overlapped resource when a resource used by the channel state information reference signal overlaps a resource used by a downlink demodulation reference signal of the second communication node; or a rule of using the resource when a resource used by the channel state information reference signal is located on the same OFDM symbol as a resource of a downlink demodulation reference signal of the second communication node.

The configuration information of the channel state information reference signal may include information related to the channel state information reference signal such as sending-channel information and sending time when the channel state information reference signal is sent, and the second communication node may know, based on the configuration information, how the channel state information reference signal is sent so as to perform reception by the second communication node. However, since the network resources are public and the resources used by the channel state information reference signal may be occupied by other signals at the same time, the specific sending manner of the channel state information reference signal is indefinite in the configuration information; therefore, the embodiment provides a preset rule. The preset rule in the embodiment is described below in detail.

Implementation One

A first communication node sends configuration information of a channel state information reference signal to a second communication node.

The first communication node sends the channel state information reference signal according to a preset rule.

Optionally, the preset rule may include at least one of: a rule of using the overlapped resource when a resource used by the channel state information reference signal overlaps a resource in a control resource set of the second communication node or a rule of using the resource when a resource used by the channel state information reference signal is located on the same OFDM symbol as a resource in a control resource set of the second communication node.

Optionally, the quasi-co-location parameter of the channel state information reference signal is the same as the quasi-co-location parameter of the control channel in the set of control resources received by the second communication node. For example, the second communication node receives the channel state information reference signal by using receiving beam 1 and also receives the control channel in the set of control resources by using receiving beam 1.

Implementation Two

A first communication node sends configuration information of a channel state information reference signal to a second communication node.

The first communication node sends the channel state information reference signal according to a preset rule.

Optionally, the preset rule may include at least one of: a rule of using the overlapped resource when a resource used by the channel state information reference signal overlaps a resource in a control resource set of the second communication node or a rule of using the resource when a resource used by the channel state information reference signal is located on the same OFDM symbol as a resource in a control resource set of the second communication node.

For example, when the OFDM symbols for sending the channel state information reference signal to the second communication node and the OFDM symbols used in the control resource set overlap in the time domain and in the frequency domain, the first communication node sends the channel state information reference signal on the overlapped resource, and the first communication node does not use the control resource set including the overlapped resource to send control information to the second communication node.

Implementation Three

A first communication node sends configuration information of a channel state information reference signal to a second communication node.

The first communication node sends the channel state information reference signal according to a preset rule.

Optionally, the preset rule may include at least one of: a rule of using the overlapped resource when a resource used by the channel state information reference signal overlaps a resource in a control resource set of the second communication node or a rule of using the resource when a resource used by the channel state information reference signal is located on the same OFDM symbol as a resource in a control resource set of the second communication node.

For example, when the OFDM symbols for sending the channel state information reference signal to the second communication node and the OFDM symbols used in the control resource set overlap in the time domain but not in the frequency domain, the first communication node sends the channel state information reference signal on the overlapped OFDM symbols, and the first communication node does not use the control resource set including the overlapped OFDM symbols to send control information to the second communication node.

For example, when the OFDM symbols for sending the channel state information reference signal to the second communication node and the OFDM symbols used in the control resource set overlap in the time domain but not in the frequency domain, the first communication node sends the channel state information reference signal on the overlapped OFDM symbols, and the first communication node uses the control resource set including the overlapped OFDM symbols to send control information to the second communication node.

Implementation Four

A first communication node sends configuration information of a channel state information reference signal to a second communication node.

The first communication node sends the channel state information reference signal according to a preset rule.

Optionally, the preset rule may include at least one of: a rule of using the overlapped resource when a resource used by the channel state information reference signal overlaps a resource in a control resource set of the second communication node, a rule of using the resource when a resource used by the channel state information reference signal is located on the same OFDM symbol as a resource in a control resource set of the second communication node, a rule of using the overlapped resource when a resource used by the channel state information reference signal overlaps a resource used by a downlink demodulation reference signal of the second communication node, or a rule of using the resource when a resource used by the channel state information reference signal is located on the same OFDM symbol as a resource of a downlink demodulation reference signal of the second communication node.

Optionally, the preset rule is predefined or negotiated by the first communication node and the second communication node. For example, the first communication node sends a signaling to the second communication node to configure the preset rule. For another example, the second communication node may feed back its own capability information to the first communication node, and the first communication node determines the preset rule according to the capability information of the second communication node.

Implementation Five

A first communication node sends configuration information of a channel state information reference signal to a second communication node.

The first communication node sends the channel state information reference signal according to a preset rule.

Optionally, the preset rule may include at least one of: a rule of using the overlapped resource when a resource used by the channel state information reference signal overlaps a resource in a control resource set of the second communication node, a rule of using the resource when a resource used by the channel state information reference signal is located on the same OFDM symbol as a resource in a control resource set of the second communication node, a rule of using the overlapped resource when a resource used by the channel state information reference signal overlaps a resource used by a downlink demodulation reference signal of the second communication node, or a rule of using the resource when a resource used by the channel state information reference signal is located on the same OFDM symbol as a resource of a downlink demodulation reference signal of the second communication node.

Optionally, the first communication node determines, according to a relevant parameter of the second communication node, whether to use the preset rule for sending the channel state information reference signal. Optionally, the relevant parameter may include at least one of: a type of the second communication node, a control information transmission parameter related to the second communication node, a transmission parameter of the channel state information reference signal, time when the second communication node sends feedback information, or a transmission parameter of a demodulation reference signal.

For example, if a processing capability of the second communication node is greater than a preset threshold, the first communication node may simultaneously send the channel state information reference signal and the control channel to the second communication node on the overlapped ODFM symbols in the time domain when the resources of the channel state information reference signal and the resources of the control resource set partially overlap in the time domain but not overlap in the frequency domain; if the processing capability of the second communication node is less than the preset threshold, the first communication node may merely send the channel state information reference signal on the overlapped ODFM symbols in the time domain when the resources of the channel state information reference signal and the resources of the control resource set partially overlap in the time domain but not overlap in the frequency domain.

For example, if the transmission period of a control information transmission parameter related to the second communication node is greater than a preset threshold, the first communication node may simultaneously send the channel state information reference signal and the control channel to the second communication node on the overlapped ODFM symbols in the time domain when the resources of the channel state information reference signal and the resources of the control resource set partially overlap in the time domain but not overlap in the frequency domain; if the transmission period of the control information transmission parameter related to the second communication node is less than the preset threshold, the first communication node may merely send the channel state information reference signal on the overlapped ODFM symbols in the time domain when the resources of the channel state information reference signal and the resources of the control resource set partially overlap in the time domain but not overlap in the frequency domain.

For example, if the channel state information reference signal is periodically sent, the first communication node may simultaneously send the channel state information reference signal and the control channel to the second communication node on the overlapped ODFM symbols in the time domain when the resources of the channel state information reference signal and the resources of the control resource set partially overlap in the time domain but not overlap in the frequency domain; if the channel state information reference signal is periodically sent, the first communication node may merely send the channel state information reference signal on the overlapped ODFM symbols in the time domain when the resources of the channel state information reference signal and the resources of the control resource set partially overlap in the time domain but not overlap in the frequency domain.

For example, if the sending time of the feedback information obtained by the second communication node from measurement on the channel state information reference signal is greater than a specific threshold, the first communication node may simultaneously send the channel state information reference signal and the control channel to the second communication node on the overlapped ODFM symbols in the time domain when the resources of the channel state information reference signal and the resources of the control resource set partially overlap in the time domain but not overlap in the frequency domain; if the sending time of the feedback information obtained by the second communication node from measurement on the channel state information reference signal is less than or equal to the specific threshold, the first communication node may merely send the channel state information reference signal on the overlapped ODFM symbols in the time domain when the resources of the channel state information reference signal and the resources of the control resource set partially overlap in the time domain but not overlap in the frequency domain.

According to the control information processing method provided by the embodiment, the sending of the channel state information reference signal is determined according to a specific rule, and specifically, the rule is set when the resources used by the channel state information reference signal overlap or are located on the same OFDM symbols as the resources in the control resource set of the second communication node, or overlap or are located on the same OFDM symbols as the resources used by the downlink demodulation reference signal of the second communication node. Therefore, the flexibility of the system is improved.

Eighth Embodiment

Figure 8:
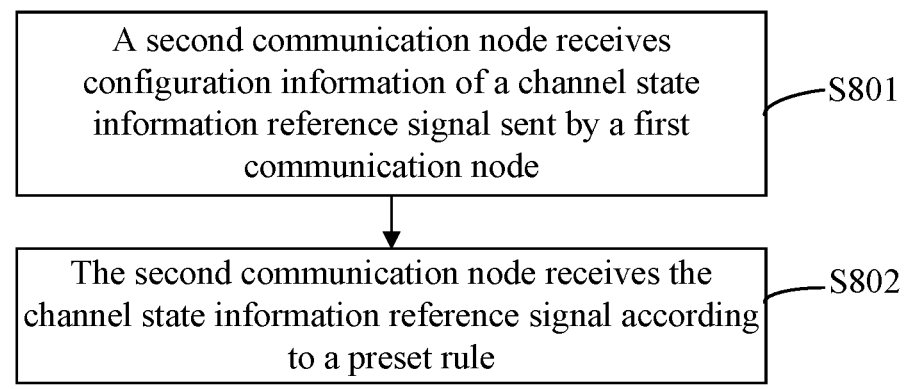
FIG. 8 is a flowchart of a control information processing method according to an eighth embodiment of the present disclosure.

Referring to FIG. 8, FIG. 8 is a flowchart of a control information processing method according to an eighth embodiment of the present disclosure. The method may include S801 and S802.

In S801, a second communication node receives configuration information of a channel state information reference signal sent by a first communication node.

In S802, the second communication node receives the channel state information reference signal according to a preset rule.

Optionally, the preset rule in the embodiment may include at least one of: a rule of using the overlapped resource when a resource used by the channel state information reference signal overlaps a resource in a control resource set of the second communication node; a rule of using the resource when a resource used by the channel state information reference signal is located on the same OFDM symbol as a resource in a control resource set of the second communication node; a rule of using the overlapped resource when a resource used by the channel state information reference signal overlaps a resource used by a downlink demodulation reference signal of the second communication node; or a rule of using the resource when a resource used by the channel state information reference signal is located on the same OFDM symbol as a resource of a downlink demodulation reference signal of the second communication node.

The configuration information of the channel state information reference signal may include information related to the channel state information reference signal such as sending-channel information and sending time when the channel state information reference signal is sent, and the second communication node may know, based on the configuration information, how the channel state information reference signal is sent so as to perform reception by the second communication node. However, since the network resources are public and the resources used by the channel state information reference signal may be occupied by other signals at the same time, the specific sending manner of the channel state information reference signal is indefinite in the configuration information; therefore, the embodiment provides a preset rule. The preset rule in the embodiment is described below in detail.

Implementation One

A second communication node receives configuration information of a channel state information reference signal sent by a first communication node.

The second communication node receives the channel state information reference signal according to a preset rule.

Optionally, the preset rule may include at least one of: a rule of using the overlapped resource when a resource used by the channel state information reference signal overlaps a resource in a control resource set of the second communication node or a rule of using the resource when a resource used by the channel state information reference signal is located on the same OFDM symbol as a resource in a control resource set of the second communication node.

Optionally, the quasi-co-location parameter of the channel state information reference signal is the same as the quasico-location parameter of the control channel in the set of control resources received by the second communication node. For example, the second communication node receives the channel state information reference signal by using receiving beam 1 and also receives the control channel in the control resource set by using receiving beam 1.

Implementation Two

A second communication node receives configuration information of a channel state information reference signal sent by a first communication node.

The second communication node receives the channel state information reference signal according to a preset rule.

Optionally, the preset rule may include at least one of: a rule of using the overlapped resource when a resource used by the channel state information reference signal overlaps a resource in a control resource set of the second communication node or a rule of using the resource when a resource used by the channel state information reference signal is located on the same OFDM symbol as a resource in a control resource set of the second communication node.

For example, when the OFDM symbols for sending the channel state information reference signal to the second communication node and the OFDM symbols used in the control resource set overlap in the time domain and in the frequency domain, the first communication node sends the channel state information reference signal on the overlapped resource, and the first communication node does not use the control resource set including the overlapped resource to send control information to the second communication node.

Implementation Three

A second communication node receives configuration information of a channel state information reference signal sent by a first communication node.

The second communication node receives the channel state information reference signal according to a preset rule.

Optionally, the preset rule may include at least one of: a rule of using the overlapped resource when a resource used by the channel state information reference signal overlaps a resource in a control resource set of the second communication node or a rule of using the resource when a resource used by the channel state information reference signal is located on the same OFDM symbol as a resource in a control resource set of the second communication node.

For example, when the OFDM symbols for sending the channel state information reference signal to the second communication node and the OFDM symbols used in the control resource set overlap in the time domain but not in the frequency domain, the first communication node sends the channel state information reference signal on the overlapped OFDM symbols, and the first communication node does not use the control resource set including the overlapped OFDM symbols to send control information to the second communication node.

For example, when the OFDM symbols for sending the channel state information reference signal to the second communication node and the OFDM symbols used in the control resource set overlap in the time domain but not in the frequency domain, the first communication node sends the channel state information reference signal on the overlapped OFDM symbols, and the first communication node uses the control resource set including the overlapped OFDM symbols to send control information to the second communication node.

Implementation Four

A second communication node receives configuration information of a channel state information reference signal sent by a first communication node.

The second communication node receives the channel state information reference signal according to a preset rule.

Optionally, the preset rule may include at least one of: a rule of using the overlapped resource when a resource used by the channel state information reference signal overlaps a resource in a control resource set of the second communication node, a rule of using the resource when a resource used by the channel state information reference signal is located on the same OFDM symbol as a resource in a control resource set of the second communication node, a rule of using the overlapped resource when a resource used by the channel state information reference signal overlaps a resource used by a downlink demodulation reference signal of the second communication node, or a rule of using the resource when a resource used by the channel state information reference signal is located on the same OFDM symbol as a resource of a downlink demodulation reference signal of the second communication node.

Optionally, the preset rule is predefined or negotiated by the first communication node and the second communication node. For example, the first communication node sends a signaling to the second communication node to configure the preset rule. For another example, the second communication node may feed back its own capability information to the first communication node, and the first communication node determines the preset rule according to the capability information of the second communication node.

Implementation Five

A second communication node receives configuration information of a channel state information reference signal sent by a first communication node.

The second communication node receives the channel state information reference signal according to a preset rule.

Optionally, the preset rule may include at least one of: a rule of using the overlapped resource when a resource used by the channel state information reference signal overlaps a resource in a control resource set of the second communication node, a rule of using the resource when a resource used by the channel state information reference signal is located on the same OFDM symbol as a resource in a control resource set of the second communication node, a rule of using the overlapped resource when a resource used by the channel state information reference signal overlaps a resource used by a downlink demodulation reference signal of the second communication node, or a rule of using the resource when a resource used by the channel state information reference signal is located on the same OFDM symbol as a resource of a downlink demodulation reference signal of the second communication node.

Optionally, the first communication node determines, according to a relevant parameter of the second communication node, whether to use the preset rule for sending the channel state information reference signal. Optionally, the relevant parameter may include at least one of: a type of the second communication node, a control information transmission parameter related to the second communication node, a transmission parameter of the channel state information reference signal, a time when the second communication node sends feedback information, or a transmission parameter of a demodulation reference signal.

For example, if a processing capability of the second communication node is greater than a preset threshold, the first communication node may simultaneously send the channel state information reference signal and the control channel to the second communication node on the overlapped ODFM symbols in the time domain when the resources of the channel state information reference signal and the resources of the control resource set partially overlap in the time domain but not overlap in the frequency domain; if the processing capability of the second communication node is less than the preset threshold, the first communication node may merely send the channel state information reference signal on the overlapped ODFM symbols in the time domain when the resources of the channel state information reference signal and the resources of the control resource set partially overlap in the time domain but not overlap in the frequency domain.

For example, if the transmission period of a control information transmission parameter related to the second communication node is greater than a preset threshold, the first communication node may simultaneously send the channel state information reference signal and the control channel to the second communication node on the overlapped ODFM symbols in the time domain when the resources of the channel state information reference signal and the resources of the control resource set partially overlap in the time domain but not overlap in the frequency domain; if the transmission period of the control information transmission parameter related to the second communication node is less than the preset threshold, the first communication node may merely send the channel state information reference signal on the overlapped ODFM symbols in the time domain when the resources of the channel state information reference signal and the resources of the control resource set partially overlap in the time domain but not overlap in the frequency domain.

For example, if the channel state information reference signal is periodically sent, the first communication node may simultaneously send the channel state information reference signal and the control channel to the second communication node on the overlapped ODFM symbols in the time domain when the resources of the channel state information reference signal and the resources of the control resource set partially overlap in the time domain but not overlap in the frequency domain; if the channel state information reference signal is periodically sent, the first communication node may merely send the channel state information reference signal on the overlapped ODFM symbols in the time domain when the resources of the channel state information reference signal and the resources of the control resource set partially overlap in the time domain but not overlap in the frequency domain.

For example, if the sending time of the feedback information obtained by the second communication node from measurement on the channel state information reference signal is greater than a specific threshold, the first communication node may simultaneously send the channel state information reference signal and the control channel to the second communication node on the overlapped ODFM symbols in the time domain when the resources of the channel state information reference signal and the resources of the control resource set partially overlap in the time domain but not overlap in the frequency domain; if the sending time of the feedback information obtained by the second communication node from measurement on the channel state information reference signal is less than or equal to the specific threshold, the first communication node may merely send the channel state information reference signal on the overlapped ODFM symbols in the time domain when the resources of the channel state information reference signal and the resources of the control resource set partially overlap in the time domain but not overlap in the frequency domain.

According to the control information processing method provided by the embodiment, the sending of the channel state information reference signal is determined according to a specific rule, and specifically, the rule is set when the resources used by the channel state information reference signal overlap or are located on the same OFDM symbols as the resources in the control resource set of the second communication node, or overlap or are located on the same OFDM symbols as the resources used by the downlink demodulation reference signal of the second communication node. Therefore, the flexibility of the system is improved.

Ninth Embodiment

Figure 9:
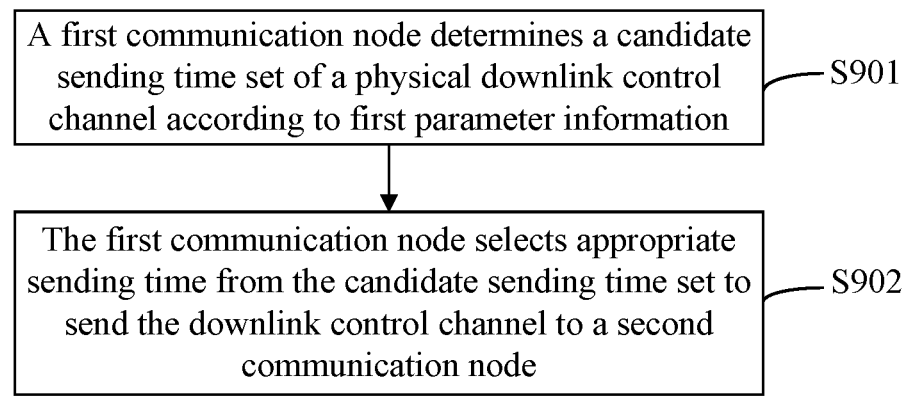
FIG. 9 is a flowchart of a control information processing method according to a ninth embodiment of the present disclosure.

Referring to FIG. 9, FIG. 9 is a flowchart of a control information processing method according to a ninth embodiment of the present disclosure. The method may include S901 and S902.

In S901, a first communication node determines a candidate sending time set of a physical downlink control channel related to a random access process according to first parameter information carried by a physical broadcast channel.

In S902, the first communication node selects appropriate sending time from the candidate sending time set for sending the downlink control channel to a second communication node.

Optionally, the first parameter information may include at least one of: a candidate sending time set of a physical downlink control channel related to a random access process, a parameter of a demodulation reference signal of a physical broadcast channel, or a time-frequency resource used by the first parameter information.

Sending of a downlink control channel is equivalent to sending corresponding information such as a signal and an instruction to the second communication node through the downlink control channel, where the specific forms of the signal and the instruction are not limited. The implementation of the embodiment is described in detail below.

Implementation One

The first communication node determines, according to second parameter information (e.g., remaining system information (RMSI)) carried by a physical downlink shared channel, a candidate sending time set for a physical downlink control channel related to a random access process.

The first communication node selects appropriate sending time from the candidate sending time set for sending the downlink control channel to a second communication node.

Optionally, the second parameter information may include at least one of: a candidate sending time set of a physical downlink control channel related to a random access process, a parameter of a demodulation reference signal of the second parameter information, or a time-frequency resource used by the second parameter information.

Implementation Two

The first communication node determines, according to second parameter information carried by a physical downlink shared channel, a candidate sending time set for a physical downlink control channel related to a random access process.

The first communication node selects appropriate sending time from the candidate sending time set for sending the downlink control channel to a second communication node.

Optionally, the second parameter information may include at least one of: a candidate sending time set of a physical downlink control channel related to a random access process, a parameter of a demodulation reference signal of second parameter information, or a time-frequency resource used by the second parameter information.

Optionally, the minimum interval of candidate sending time of the physical downlink control channel carrying the second parameter information is greater than or equal to the minimum interval of candidate sending time of the physical downlink control channel related to the random access process.

Implementation Three

A first communication node determines a candidate sending time set of a physical downlink control channel related to a random access process according to first parameter information carried by a physical broadcast channel or second parameter information carried by a physical downlink shared channel.

The first communication node selects appropriate sending time from the candidate sending time set for sending the downlink control channel to a second communication node.

Optionally, the second parameter information may include at least one of: a candidate sending time set of a physical downlink control channel related to a random access process, a parameter of a demodulation reference signal of the second parameter information, or a time-frequency resource used by the second parameter information.

Optionally, the parameter of the demodulation reference signal may include at least one of: a sequence used by a demodulation reference signal, a transmission resource used by a demodulation reference signal, or a scrambling code used by a demodulation reference signal.

According to the control information processing method provided by the embodiment, the downlink control channel is sent to the second communication node based on the determined candidate sending time set, and specifically, the candidate sending time set of the physical downlink control channel related to the random access process may be determined according to the first parameter information carried by the physical broadcast channel or the second parameter information carried by the physical downlink shared channel, so that the appropriate sending time is determined, and the flexibility of the system is improved.

Tenth Embodiment

Figure 10:
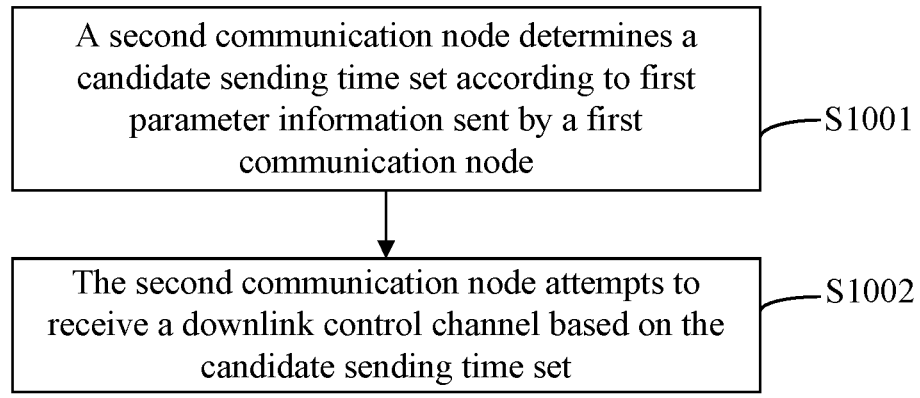
FIG. 10 is a flowchart of a control information processing method according to a tenth embodiment of the present disclosure.

Referring to FIG. 10, FIG. 10 is a flowchart of a control information processing method according to a tenth embodiment of the present disclosure. The method may include S1001 and S1002.

In S1001, a second communication node determines a candidate sending time set of a physical downlink control channel related to a random access process according to first parameter information carried by a physical broadcast channel sent by a first communication node.

In S1002, the second communication node attempts to receive the downlink control channel based on the candidate sending time set.

Optionally, the first parameter information may include at least one of: a candidate sending time set of a physical downlink control channel related to a random access process, a parameter of a demodulation reference signal of a physical broadcast channel, or a time-frequency resource used by the first parameter information.

Receiving of a downlink control channel is equivalent to receiving corresponding information such as a signal and an instruction to the second communication node through the downlink control channel, where the specific forms of the signal and the instruction are not limited. The implementation of the embodiment is described in detail below.

Implementation One

A second communication node determines a candidate sending time set for a physical downlink control channel related to a random access process according to second parameter information carried by a physical downlink shared channel sent by a first communication node.

The second communication node attempts to receive the downlink control channel based on the candidate sending time set.

Optionally, the second parameter information may include at least one of: a candidate sending time set of a physical downlink control channel related to a random access process, a parameter of a demodulation reference signal of the second parameter information, or a time-frequency resource used by the second parameter information.

Implementation Two

A second communication node determines a candidate sending time set for a physical downlink control channel related to a random access process according to second parameter information carried by a physical downlink shared channel sent by a first communication node.

The second communication node attempts to receive the downlink control channel based on the candidate sending time set.

Optionally, the second parameter information may include at least one of: a candidate sending time set of a physical downlink control channel related to a random access process, a parameter of a demodulation reference signal of second parameter information, or a time-frequency resource used by the second parameter information.

Optionally, the minimum interval of candidate sending time of the physical downlink control channel carrying the second parameter information is greater than or equal to the minimum interval of candidate sending time of the physical downlink control channel related to the random access process.

Implementation Three

A second communication node determines a candidate sending time set of a physical downlink control channel related to a random access process according to first parameter information carried by a physical broadcast channel or second parameter information carried by a physical downlink shared channel sent by a first communication node.

The second communication node attempts to receive the downlink control channel based on the candidate sending time set.

Optionally, the second parameter information may include at least one of: a candidate sending time set of a physical downlink control channel related to a random access process, a parameter of a demodulation reference signal of the second parameter information, or a time-frequency resource used by the second parameter information.

Optionally, the parameter of the demodulation reference signal may include at least one of: a sequence used by a demodulation reference signal, a transmission resource used by a demodulation reference signal, or a scrambling code used by a demodulation reference signal.

Eleventh Embodiment

Figure 11:
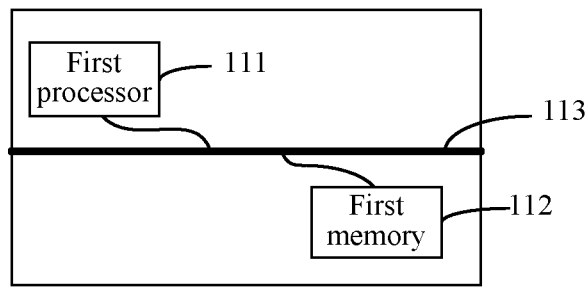
FIG. 11 is a schematic diagram of a communication node according to an eleventh embodiment of the present disclosure.

Referring to FIG. 11, FIG. 11 is a schematic diagram of a communication node according to the embodiment. The communication node may include: a first processor 111, a first memory 112 and a first communication bus 113. The first communication bus 113 is configured to implement connection and communication between the first processor 111 and the first memory 112. The first processor 111 is configured to execute a control information processing program stored in the first memory 112 to implement the HARQ feedback processing method, or the signal processing method, or the control information processing method described above, which are not described in detail here.

Figure 12:
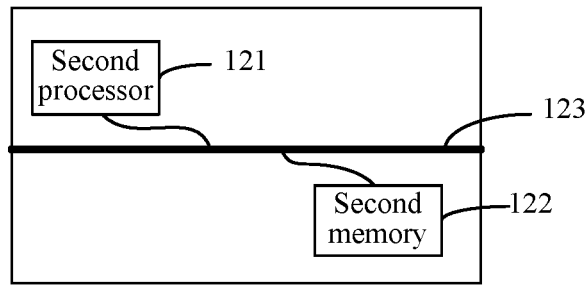
FIG. 12 is a schematic diagram of another communication node according to the eleventh embodiment of the present disclosure.

Referring to FIG. 12, FIG. 12 is a schematic diagram of another communication node according to the embodiment. The communication node may include: a second processor 121, a second memory 122 and a second communication bus 123. The second communication bus 123 is configured to implement connection and communication between the second processor 121 and the second memory 122. The second processor 121 is configured to execute a control information processing program stored in the second memory 122 to implement the HARQ feedback processing method, or the signal processing method, or the control information processing method described above, which are not described in detail here.

In addition, the embodiment further provides a computer-readable storage medium, which is configured to store one or more computer programs executable by one or more processors to implement the HARQ feedback processing methods, the signal processing methods, and the control information processing methods described above, which are not described in detail here.

It should be noted that the sending manner mentioned in various embodiments of the present disclosure includes at least one of: a sending beam, a sending port, a sending resource, a reference signal sequence, or a sending precoding matrix (in an analog, digital or hybrid manner).

It should be noted that the receiving manner mentioned in various embodiments of the present disclosure includes at least one of: a receiving beam, a receiving port, a receiving resource, a reference signal sequence, a receiving precoding matrix (in an analog, digital or hybrid manner), or a receiver algorithm.

It should be noted that the beam may be a resource (e.g., sending-end precoding, receiving-end precoding, an antenna port, an antenna weight vector and an antenna weight matrix). A beam serial number may be replaced with a resource index, since the beam may be bound to some time-frequency code resources for transmission. The beam may also be a transmission (sending/receiving) manner. The transmission manner may include space division multiplexing, frequency-domain/time-domain diversity or the like. The receiving beam refers to a beam at the receiving end which does not need to be indicated, or a beam resource at the receiving end which may be indicated by the sending end through the Quasi-Co-Location (QCL) of the current reference signal and antenna port and the reference signal (or reference signal) and antenna port fed back and reported by the UE.

It should be noted that the density referred to in the present disclosure is the per-antenna port density, which is obtained by dividing the resources occupied by the per-antenna port by the resource occupied by the control channel transmission format.

Apparently, it should be understood by those skilled in the art that each of the modules or steps in the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage medium (such as a read-only memory (ROM)/random access memory (RAM), a magnetic disk or an optical disk) and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. Therefore, the present disclosure is not limited to any specific combination of hardware and software.

The above content is a further detailed description of the present disclosure in conjunction with the specific embodiments, and the specific implementation of the present disclosure is not limited to the description. For those skilled in the art to which the present disclosure pertains, a number of simple deductions or substitutions may be made without departing from the concept of the present disclosure and should fall within the protection scope of the present disclosure.

What is claimed is:

1. A hybrid automatic repeat request (HARQ) feedback processing method, comprising:
generating control information by a first communication node; and
sending, by the first communication node, the control information to a second communication node;
wherein the control information comprises HARQ feedback time indication information used for determining HARQ feedback time by the second communication node, the HARQ feedback time indication information comprises a time length of the HARQ feedback time, and the time length comprises at least one of:
the time length being N times as long as a potential transmission period of the control information;
the time length being N times as long as a basic allocation unit of a potential transmission period of the control information; or
the time length being N times as long as a negotiated allocation unit negotiated by the first communication node with the second communication node;
wherein N is an integer greater than or equal to 1;
wherein the potential transmission period of the control information comprises M orthogonal frequency division multiplexing (OFDM) symbol sets, each of the M OFDM symbol sets comprises Z OFDM symbols, and a subcarrier spacing corresponding to each of the Z OFDM symbols is an integer multiple of 15 KHz or a power of 2 times of 15 KHz; wherein M and Z are both integers greater than or equal to 1;
wherein a time length of the each of the M OFDM symbol sets is equal to the basic allocation unit of the potential transmission period of the control information; and
wherein the potential transmission period of the control information or the basic allocation unit of the potential transmission period of the control information is predefined or configured by the first communication node.

2. A hybrid automatic repeat request (HARQ) feedback processing method, comprising:
receiving, by a second communication node, control information sent by a first communication node; and
determining, by the second communication node according to the control information, time for sending an HARQ feedback; wherein the control information comprises HARQ feedback time indication information, the HARQ feedback time indication information comprises a time length of the HARQ feedback time, and the time length comprises at least one of:

the time length being N times as long as a potential transmission period of the control information;

the time length being N times as long as a basic allocation unit of a potential transmission period of the control information; or the time length being N times as long as a negotiated allocation unit negotiated by the first communication node with the second communication node;

wherein N is an integer greater than or equal to 1;

wherein the potential transmission period of the control information comprises M orthogonal frequency division multiplexing (OFDM) symbol sets, each of the M OFDM symbol sets comprises Z OFDM symbols, and a subcarrier spacing corresponding to each of the Z OFDM symbols is an integer multiple of 15 KHz or a power of 2 times of 15 KHz; wherein M and Z are both integers greater than or equal to 1; and wherein a time length of the each of the M OFDM symbol sets is equal to the basic allocation unit of the potential transmission period of the control information;

wherein the potential transmission period of the control information or the basic allocation unit of the potential transmission period of the control information is predefined or configured by the first communication node to the second communication node.

3. A communication node, comprising:
a first processor;
a first memory; and
a first communication bus;
wherein the first communication bus is configured to implement connection and communication between the first processor and the first memory; and
wherein the first processor is configured to execute a control information processing program stored in the first memory to implement the steps of a HARQ feedback processing method, comprising:
generating control information by a first communication node; and
sending, by the first communication node, the control information to a second communication node;
wherein the control information comprises HARQ feedback time indication information used for determining HARQ feedback time by the second communication node, the HARQ feedback time indication information comprises a time length of the HARQ feedback time, and the time length comprises at least one of:
the time length being N times as long as a potential transmission period of the control information;
the time length being N times as long as a basic allocation unit of a potential transmission period of the control information; or
the time length being N times as long as a negotiated allocation unit negotiated by the first communication node with the second communication node;
wherein N is an integer greater than or equal to 1;
wherein the potential transmission period of the control information comprises M orthogonal frequency division multiplexing (OFDM) symbol sets, each of the M OFDM symbol sets comprises Z OFDM symbols, and a subcarrier spacing corresponding to each of the Z OFDM symbols is an integer multiple of 15 KHz or a power of 2 times of 15 KHz; wherein M and Z are both integers greater than or equal to 1;
wherein a time length of the each of the M OFDM symbol sets is equal to the basic allocation unit of the potential transmission period of the control information; and
wherein the potential transmission period of the control information or the basic allocation unit of the potential transmission period of the control information is predefined or configured by the first communication node.

4. A communication node, comprising:
a second processor;
a second memory; and
a second communication bus;
wherein the second communication bus is configured to implement connection and communication between the second processor and the second memory; and
wherein the second processor is configured to execute a control information processing program stored in the second memory to implement the steps of a HARQ feedback processing method, comprising:
receiving, by a second communication node, control information sent by a first communication node; and
determining, by the second communication node according to the control information, time for sending an HARQ feedback; wherein the control information comprises HARQ feedback time indication information, the HARQ feedback time indication information comprises a time length of the HARQ feedback time, and the time length comprises at least one of:
the time length being N times as long as a potential transmission period of the control information;
the time length being N times as long as a basic allocation unit of a potential transmission period of the control information; or
the time length being N times as long as a negotiated allocation unit negotiated by the first communication node with the second communication node;
wherein N is an integer greater than or equal to 1;
wherein the potential transmission period of the control information comprises M orthogonal frequency division multiplexing (OFDM) symbol sets, each of the M OFDM symbol sets comprises Z OFDM symbols, and a subcarrier spacing corresponding to each of the Z OFDM symbols is an integer multiple of 15 KHz or a power of 2 times of 15 KHz; wherein M and Z are both integers greater than or equal to 1; and
wherein a time length of the each of the M OFDM symbol sets is equal to the basic allocation unit of the potential transmission period of the control information;
wherein the potential transmission period of the control information or the basic allocation unit of the potential transmission period of the control information is predefined or configured by the first communication node to the second communication node.

* * * * *